Nov. 10, 1931.   P. BURKERT   1,831,158
DISTRIBUTING MACHINE.
Original Filed Dec. 9, 1925   8 Sheets-Sheet 1
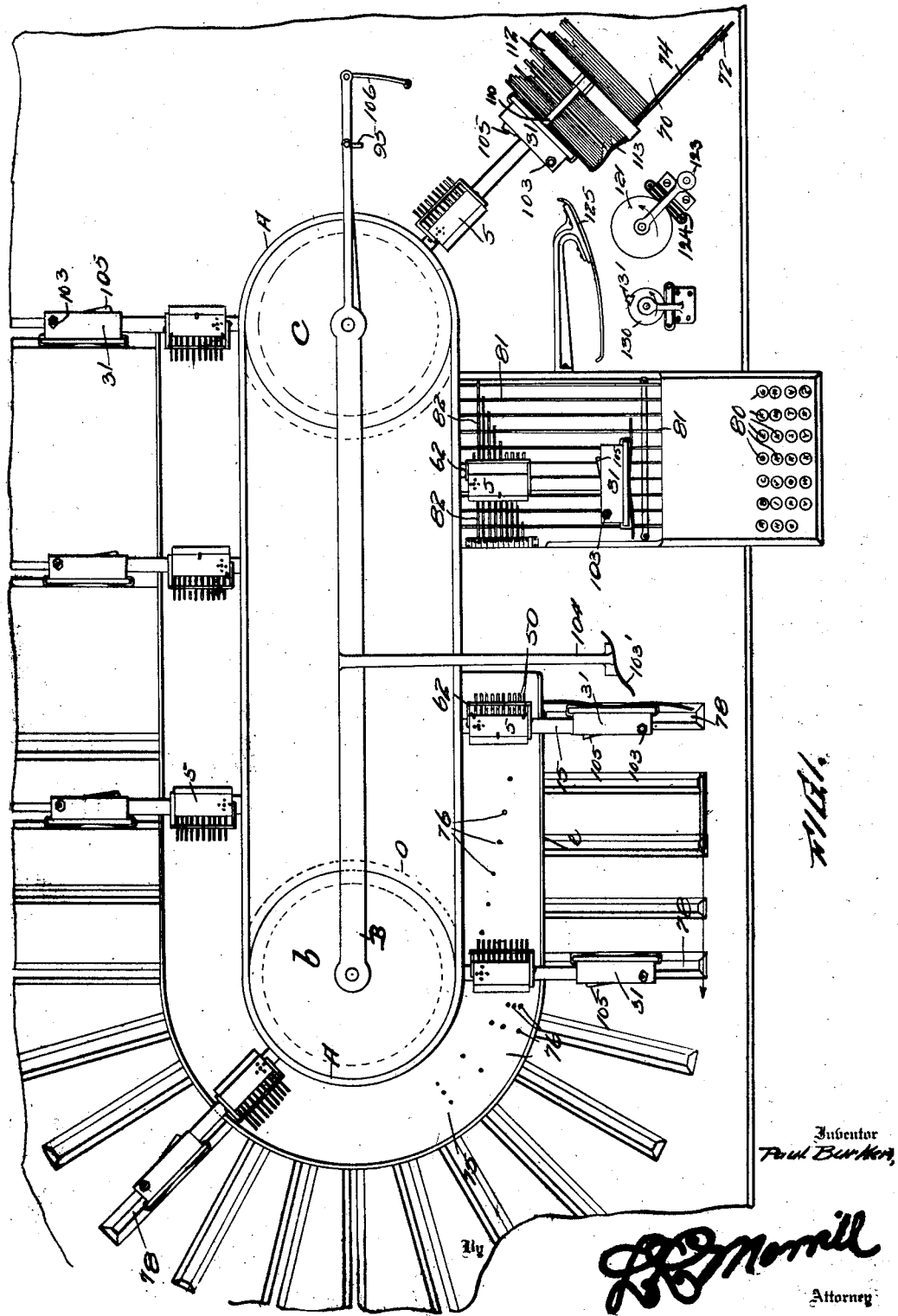
Inventor
Paul Burkert,
By
L. R. Morrill
Attorney Nov. 10, 1931.     P. BURKERT     1,831,158
DISTRIBUTING MACHINE
Original Filed Dec. 9, 1925    8 Sheets-Sheet 2
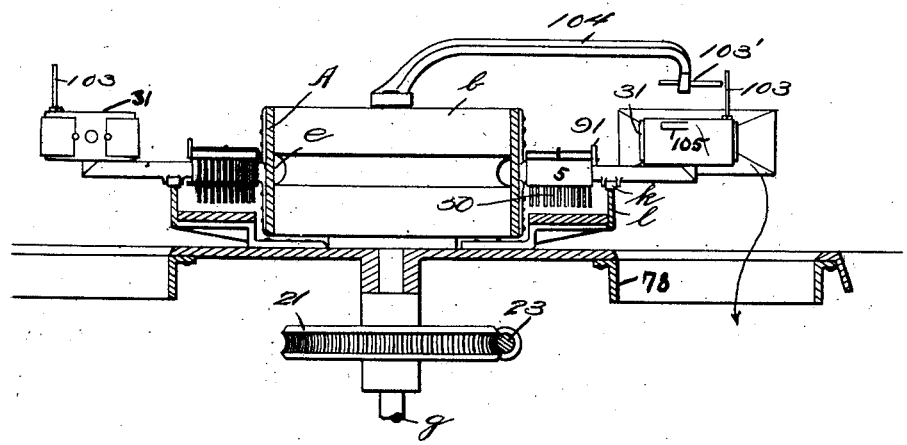
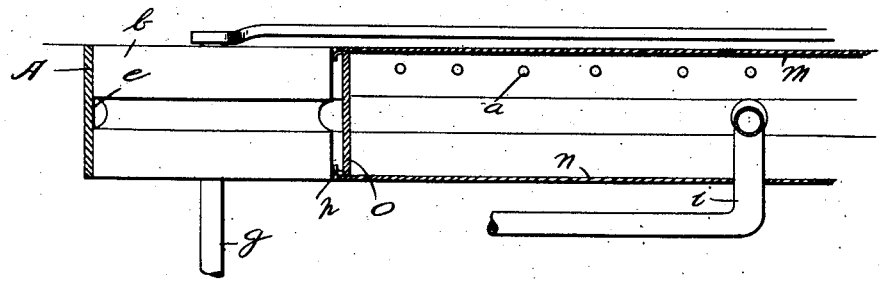
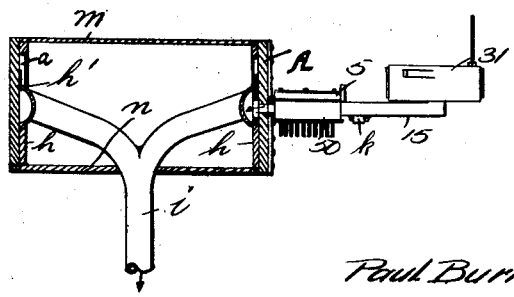

Nov. 10, 1931. P. BURKERT 1,831,158
DISTRIBUTING MACHINE
Original Filed Dec. 9, 1925  8 Sheets-Sheet 3
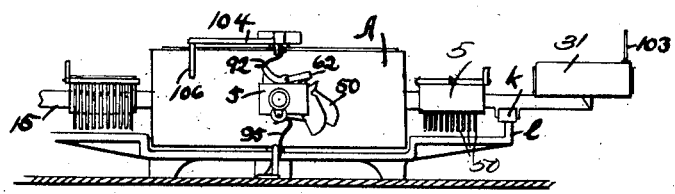
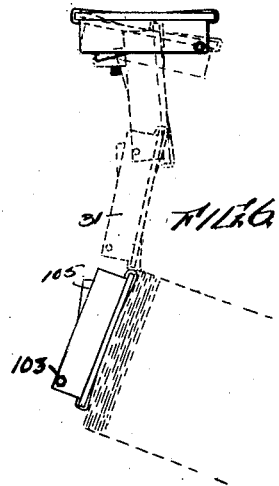
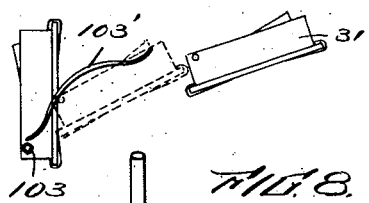
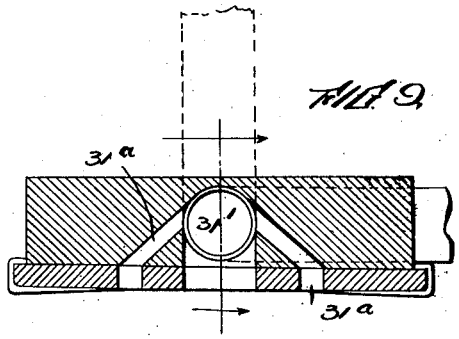
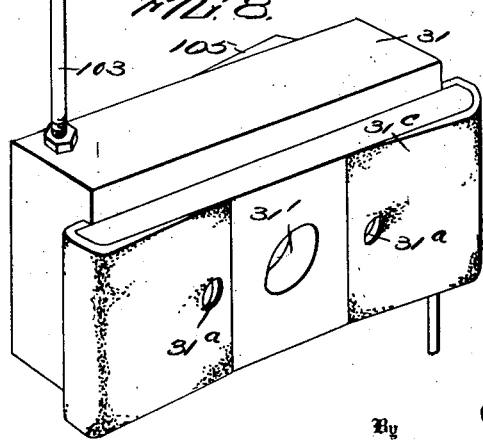
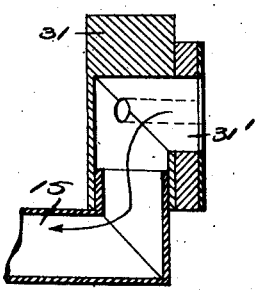

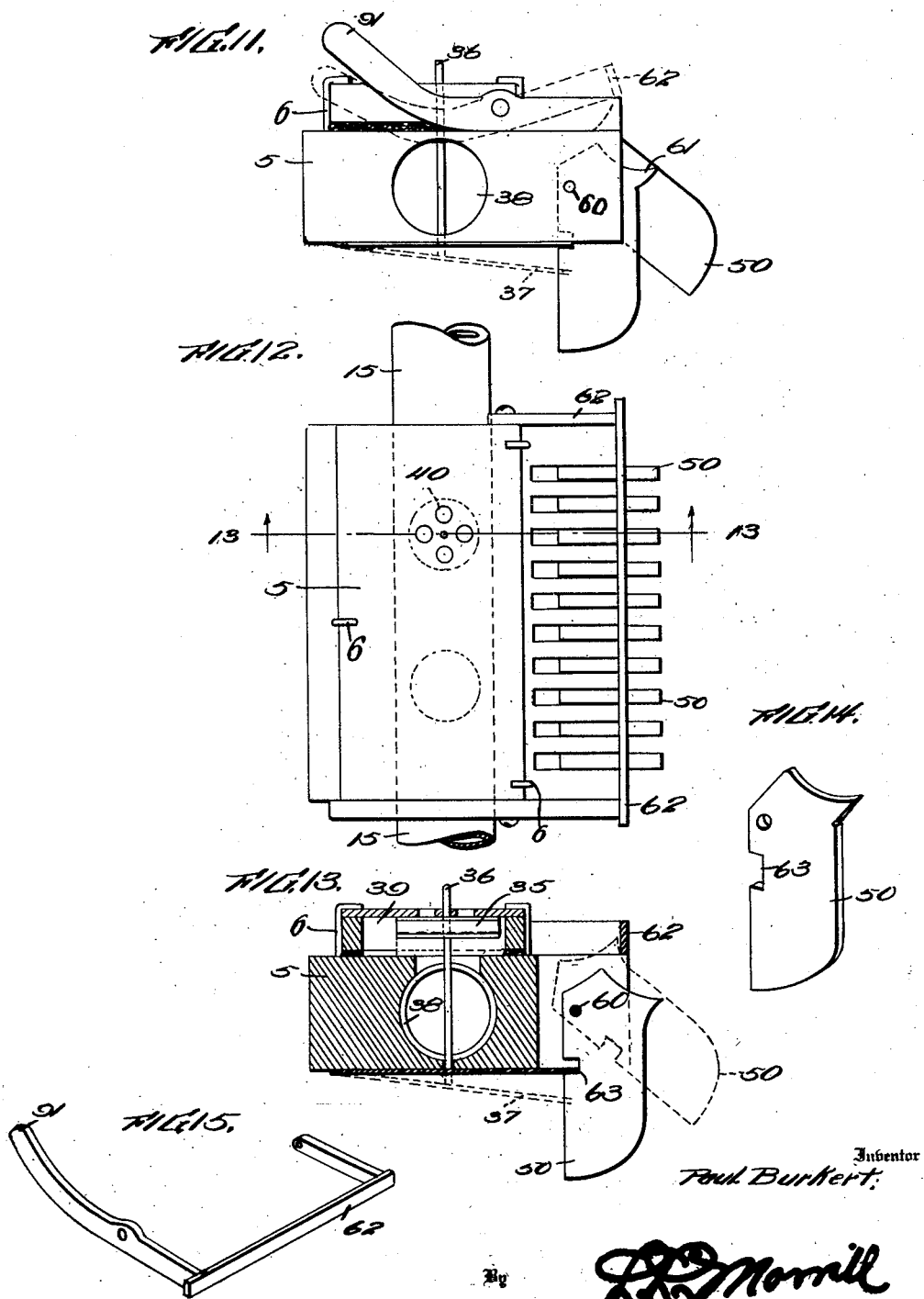

Nov. 10, 1931. P. BURKERT 1,831,158
DISTRIBUTING MACHINE
Original Filed Dec. 9, 1925   8 Sheets-Sheet 5
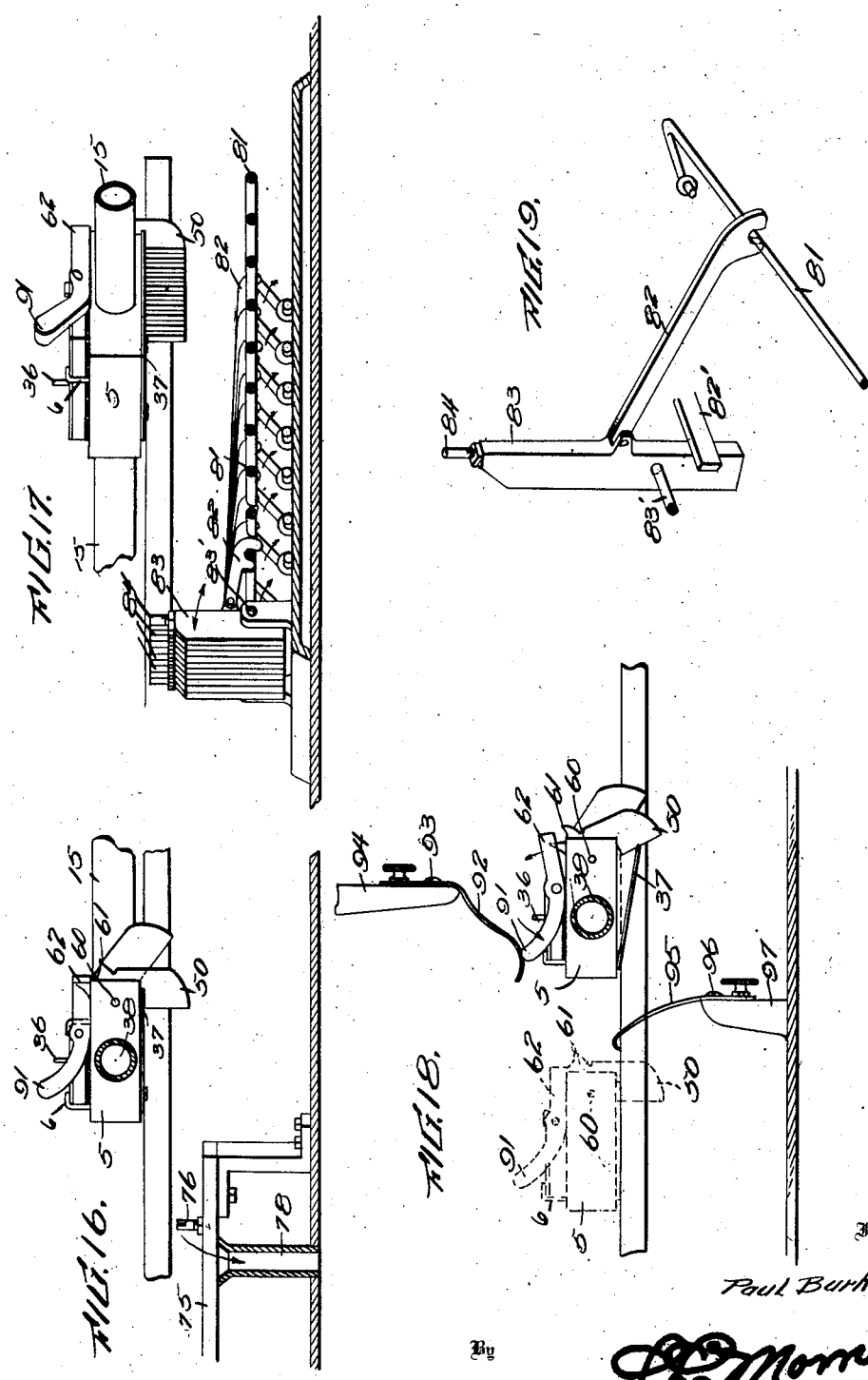
Inventor
Paul Burkert,
By
L. L. Morrill
Attorney

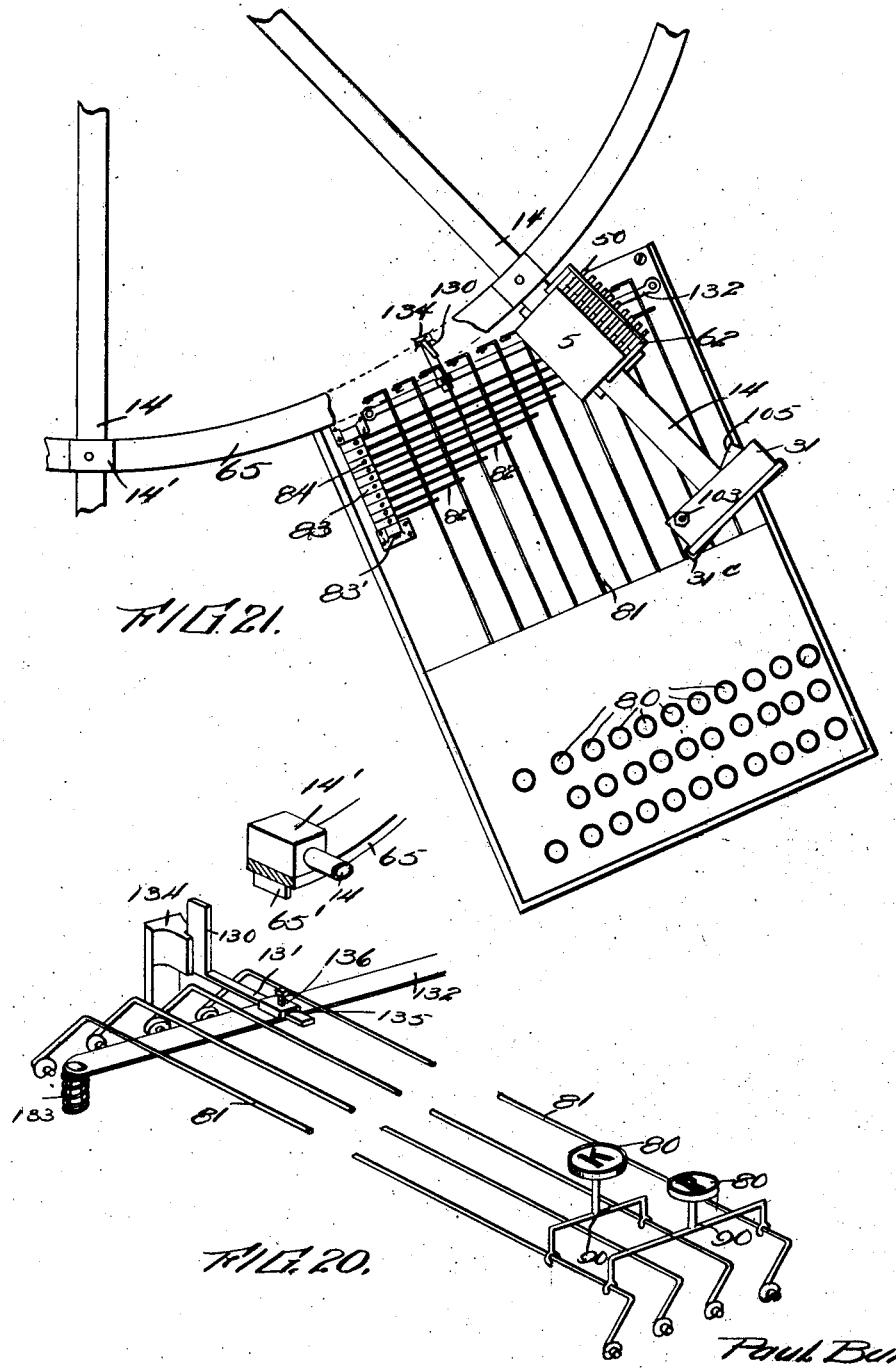

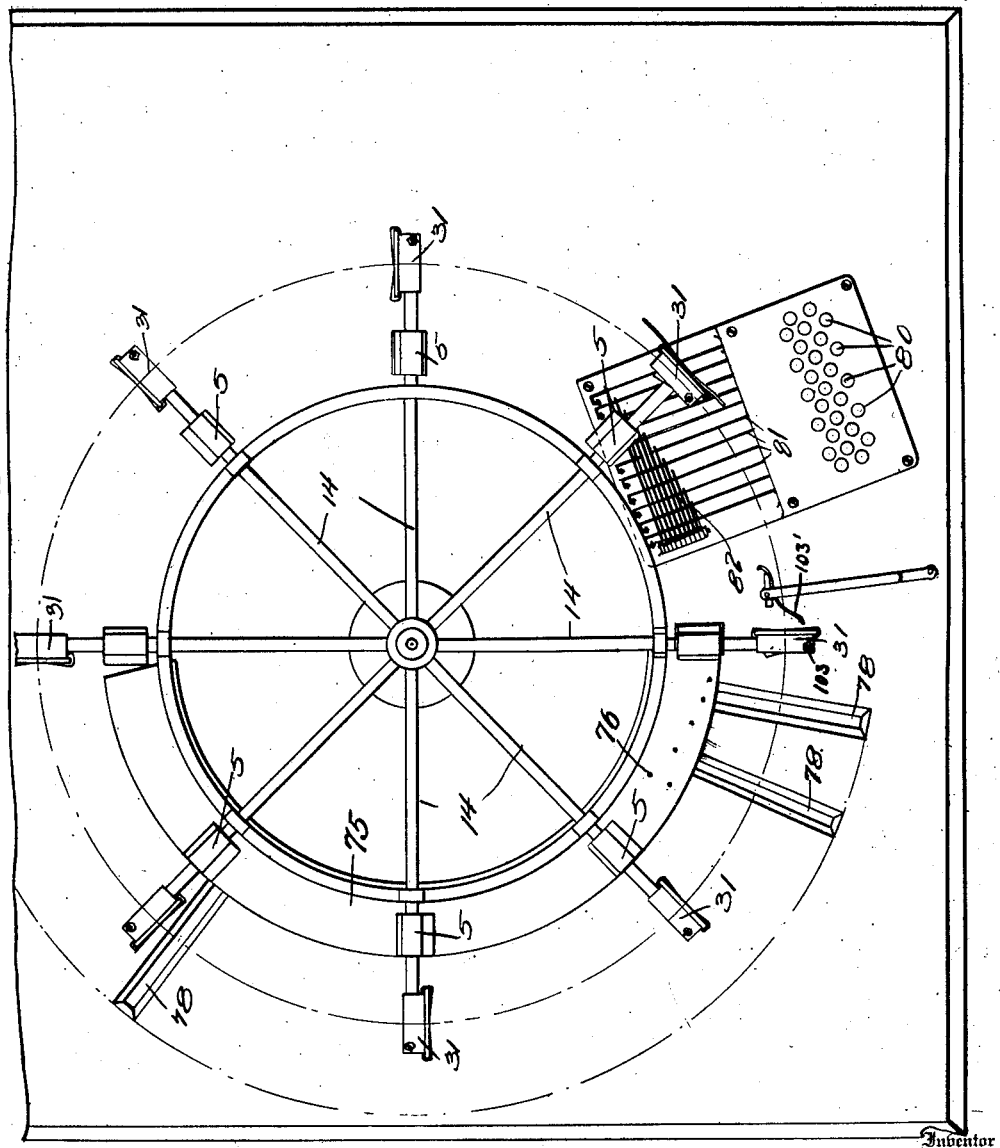

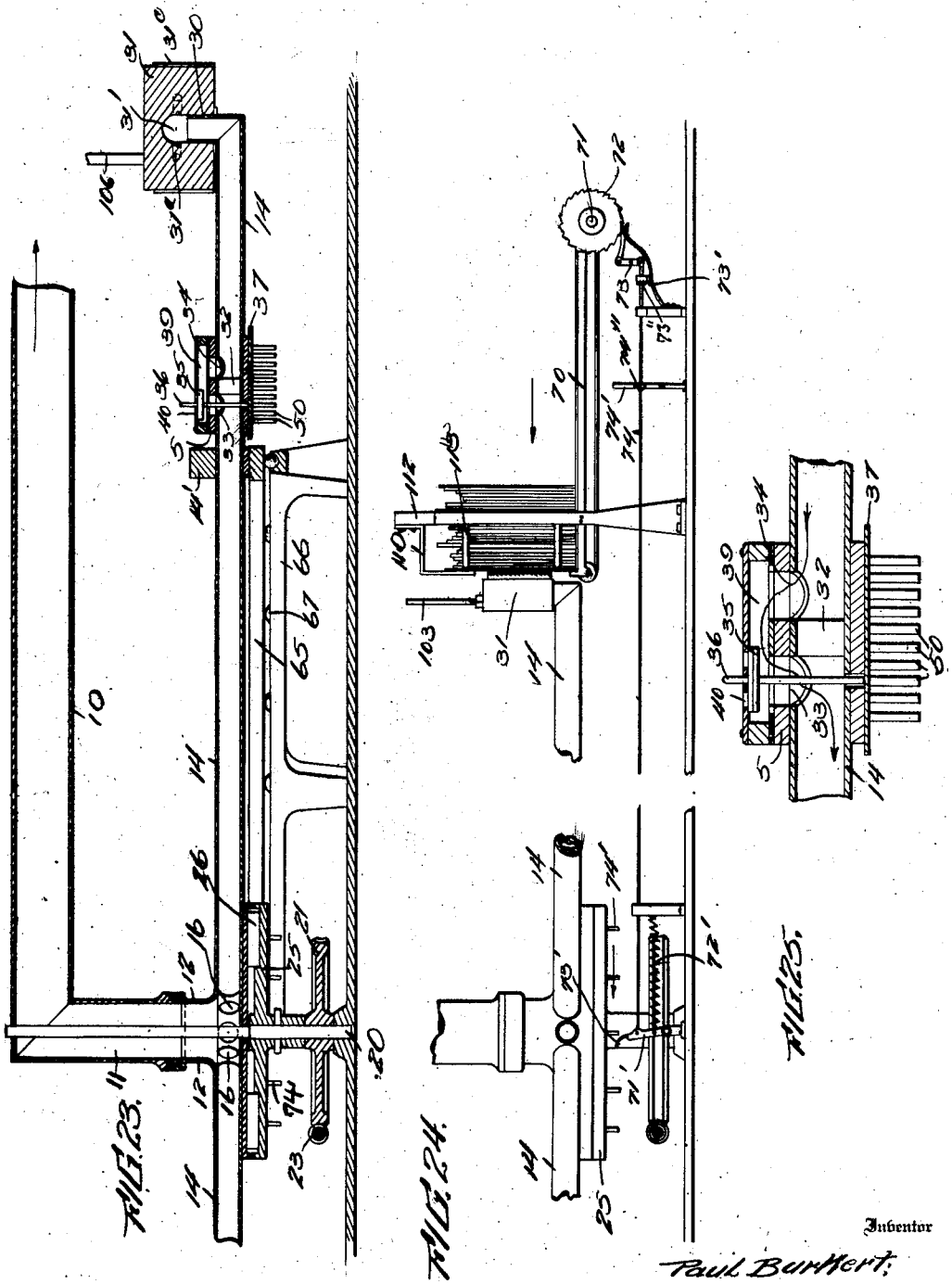

Patented Nov. 10, 1931

1,831,158

UNITED STATES PATENT OFFICE

PAUL BURKERT, OF ATLANTA, GEORGIA

DISTRIBUTING MACHINE

Application filed December 9, 1925, Serial No. 75,155. Renewed February 12, 1929.

This invention relates to mail distributing machines, and the object is to effect the routing of letters in a post office for local distribution by carriers, or to effect a primary distribution by States or otherwise in preparing mail for transmission to distant points, and is the same as that disclosed in my abandoned application Ser. No. 94,971, filed May 2, 1916, renewed February 12, 1920, Ser. No. 358,125.

A further object is to provide for the distribution, for the purpose indicated to individual receptacles, of letters which have been previously "faced" and placed in a feed chute or on a conveyor, such letters being marked during the operation with a character designating the particular operator of the machine, and if desired being post-marked and having their stamps cancelled between the initial operation of picking up the letter from the feed chute, and the final operation of this particular machine, which consists in depositing the letters in the individual receptacles corresponding with local routes, or corresponding with States, towns, etc.

With these and other objects in view, the invention consists in the provision of a chute or conveyor for receiving the letters which have first been "faced" in the usual manner, a rotating or traveling device including a plurality of air ducts from which the air is exhausted and suitable mechanism, a pneumatic letter pick-up device and carrier for transferring the letter from the initial feeding device to a point of discharge above the route boxes, selective mechanism controlling the operation of the pneumatic letter pick-up device and carrier, and key board mechanism arranged to control the selective mechanism in groups, so that any given element in the selective mechanism may be operated, or any combination of elements may be so operated from the key board, in order that a given number of selective elements, say ten, may be provided for producing combinations which will result in the discharge of letters from the carrier, after being positioned at the proper angle, at such points that they will drop into the proper route boxes in a series of perhaps one hundred and fifty of such receptacles.

The invention further includes, in combination with the above, suitable means for marking the letters but not the details of such mechanism, and an automatic stop for the main letter conveyor for holding the letter in front of the operator until the desired key is pressed.

In the accompanying drawings:

Figure 1 is a top plan view of that form of the device employing a belt conveyor.

Figure 2 is a view chiefly in vertical section, transversely of the machine near one end thereof.

Figure 3 is a view in longitudinal section showing a portion of the apparatus for exhausting air from the letter pick-up device.

Figure 4 is a vertical transverse section showing the manner of connecting the exhaust with the individual ducts of the pick-up devices.

Figure 5 is an end view of the machine.

Figure 6 shows diagrammatically the position of the letter pick-up device before it approaches the letters to be distributed and when removing a letter from the pile.

Figure 7 shows diagrammatically the pick-up device being turned upon its pivotal mounting to a position for discharging a letter into a chute or receptacle.

Figure 8 is a perspective view of the pick-up device.

Figures 9 and 10 are views in horizontal and vertical sections respectively of the pick-up device.

Figure 11 is an end elevation of the device including the selective mechanism.

Figure 12 is a top plan view thereof.

Figure 13 is a vertical transverse section on line 13—13 of Figure 12.

Figure 14 is a detail view of one of the pivoted selective members.

Figure 15 is a detail view of a bail which retains the selective members in position.

Figure 16 is a detached view showing the selective mechanism in proximity to a letter chute.

Figure 17 shows the same mechanism in position to be set from the keyboard.

Figure 18 is a detached view showing the selective mechanism being reset or placed in condition to be operated upon by the keyboard and associated parts.

Figure 19 is a detail in perspective of certain structure included in Figure 17.

Figure 20 is a detached view showing means for stopping a letter at the keyboard until released by the pressure of a key when operating the selective device.

Figure 21 is a plan view of a pick-up device and a selective device carried upon a rotating member instead of on a belt conveyor.

Figure 22 is a diagrammatic view of the rotating letter conveyor.

Figure 23 is a view in vertical section showing the principal features of the rotating conveyor type of the apparatus.

Figure 24 is a detached view in elevation showing means for operating the conveyor which feeds the letters to be distributed.

Figure 25 is an enlarged view in section of the selective mechanism.

An important feature of this apparatus is a conveyor for the letters operated by any suitable mechanism not shown in the present drawings, such as an electric motor with means in circuit therewith for controlling the speed of the motor, the aforesaid conveyor being adapted for connection with an air exhaust apparatus which produces suction at a plurality of points, as, for instance, at the ends of ducts extending from the conveyor.

In the drawings I have shown two types of conveying devices carrying air exhaust pick-up members for conveying the letters to the proper mail receptacle or chute. One of these types comprises a belt conveyor mounted to travel on vertically arranged rollers and having air ducts extending from the sides of the belt and communicating with an air exhaust duct within the opposite runs of the belt. The several air ducts carry letter pick-up devices and selective mechanism which may be operated in combinations so that a small number of pivoted selective members in a given series may be caused to control the operation of depositing letters in a large number of receptacles or mail chutes.

The second type includes a conveyor having the form of a wheel with air ducts constituting the spokes and letter pick-up devices and selective mechanism mounted on the ends of the ducts.

In Figure 1 the belt of the main letter conveyor indicated by "A" is mounted on rollers "b" and "c", having annular grooves "e", one of these rollers being driven by shaft "g" connected with any suitable source of power. A longitudinal bar B serves as a portion of the mounting means of the rollers. Within the opposite runs of the belt side members "h" are located, these sides having grooves "h'" therein registering with the grooves of the rollers. These grooves "h" therefore form, with grooves "e", a continuous duct from which air is exhausted by means of pipe "i", having a branch or branches connected with the passage specified.

A cover m and a bottom n are provided and complete a chamber which is practically coextensive with the space within the runs of the belt. A concave partition member o and a felt strip R may be located adjacent to each roller, but it is entirely practicable to exhaust the entire space within the chamber. A number of small air ducts or pores may connect grooves h' with the outer surface of sides h adjacent to the belt, for the purpose of increasing the surface of the belt subjected to suction.

The belt carries a series of ducts 15 in continuous communication with grooves h' of the sides h, and the ducts may carry supporting rollers k traveling on track l.

The rotating conveyor serves the same purpose as the belt conveyor and a brief description of the rotary form is here given, other features of construction being substantially the same in both forms of the apparatus. Both forms are regarded as efficient, but it is obvious that a machine constructed with a belt conveyor will require less floor space than a machine of the same capacity provided with a rotating conveyor.

In the form embracing a rotating conveyor, the main inlet duct adapted for connection with the exhaust apparatus is designated 10. This inlet, having a vertically extending portion 11, carries and communicates with an annular flanged portion 12 of the rotating device comprising the individual air ducts 14. These air ducts radiate from the center and have communication with an exhaust apparatus by means of ports 16. They correspond with the ducts 15 of the belt form of the device. A vertically mounted shaft 20 carries a gear wheel 21, engaged by a worm shaft 23, driven by a motor not shown.

Shaft 20 carries an annular flanged member 25 above gear wheel 21 upon which idle rollers 26 are mounted radially, these rollers permitting movement of the rotating device proper comprising the air ducts independently of gear wheel 21. Conversely the member carrying the ducts 14 may be stationary while gear wheel 21 continues to rotate in view of its direct connection with the motor. A plurality of rings 65, 66 support the rotating air ducts and are separated by anti-friction devices 67.

The devices for picking up the letters are mounted in like manner on the ducts, whether a belt conveyor or a rotating conveyor is employed.

Each duct 15 has an upwardly extending portion 30 at its outer end upon which letter pick-up device 31 is mounted, said device 31 being capable of rotation or partial rotation on 30 as a center. Each duct 15 is provided with two ports and these ports are separated by means of a division member 32 so that the air passes from one port to the other by way of a chamber in the pick-up device located above the duct proper and containing a valve which controls one of said ports. The valve communicates with an outlet so that the outer end of each duct may be placed in direct communication with atmospheric air when desired. The ports are designated 33 and 34 and the valve 35, this valve being mounted on a stem 36 which rests upon a hinged plate 37 supporting the valve in the position shown in Fig. 25 when the pick-up device is to receive and convey a letter.

The selective device 5 comprises a block having a bore 38 for the accommodation of the air duct 15 and within the upper portion of this block the chamber 39 heretofore referred to is located. Apertures 40 in the top of device 5 permit of the entrance of atmospheric air and cause the prompt return of valve 35 when hinged member 37 is dropped by the tripping of any one of the selective members 50. These members are mounted on a shaft 60 extending longitudinally of the block and have the form shown in the several views, each member being provided with an ear or lug 61 which is engaged by a pivoted bail 62 the function of which is to retain any of the devices 50 when thrown out of engagement with plate 37. The plate last mentioned is engaged by slotted portion 63 of any or all of members 50.

When the valve 35 is in the position shown in Fig. 25, producing suction within letter pick-up device 31 and plate 37 is in a substantially horizontal position, normally and at the beginning of each individual operation, all of the members 50 engage plate 37. By means of suitable mechanism described below and controlled from the keyboard, certain of selective members 50 are thrown out of engagement, any variety of combinations desired being produced, and the members 50 retained in engagement with the plate will continue to hold the valve in position to operate the letter pick-up.

The letter pick-up device mounted on the end of each air duct comprises a block 31 having a vertical central bore communicating with a transverse bore 31' extending to the outer face of the block and affording means for producing reduced pressure at the point where the letter is to be supported while being conveyed by the selective devices. The lateral bore may communicate with branch passages 31$^a$ for the purpose of distributing the aforesaid reduced pressure. The upper portion of the block is provided with tripping pin 103 engaged by a guide spring 103' mounted on a stationary member 104 at the side of the machine, and when this spring is encountered during the rotation of the conveying devices the letter pick-up is rotated about its center for the purpose of positioning the letter in a new vertical plane with reference to the mail receptacles or chutes just prior to discharging the letter into the receptacles. The letter pick-up is restored to normal position by means of device 105 carried by the back of the pick-up and inclined at an angle with reference thereto and arranged to engage a stationary member which may be carried by the frame-work of the machine and designated 106, this member being located at a point where it will be encountered just before the pick-up approaches the letter feeding device.

The letters are faced in the usual manner and are placed on conveyor 70 driven by means of shaft 71 and wheel 72, the teeth of which are engaged by a pawl 73. This pawl is controlled by rod 74 operated by pivoted arm 71' held by spring 72' and carrying spring arm 73' engaged by pins 74' on rotating member 25. The letters on conveyor 70 are prevented from being packed tightly together by reason of the fact that there will be failure to overcome the tension of spring 72' when too great a pull is required for moving rod 74, and spring arm 73' will then relax and allow the engaging pin 74' to pass without further movement of the parts. The movement of conveyor 70 may be advanced by the means described further on. The eyes of the operator will usually be toward the pile of letters on the conveyor in order that he may at once read or begin to read the address of a letter being removed by the carrier or conveyor to a point opposite the keyboard, and thence to the selective mechanism.

Annular or curved member 75 having a considerable extent of surface is provided with a series of pins 76 which cooperate with the selective members 50, so that any one of said members retained in position to be engaged by a pin or plurality of pins will be tripped upon coming to the point where such pin or pins are located. These pins 76 and selective devices 50 control the discharge of the letter from the pick-up devices to the mail receptacles or chutes 78 corresponding to the various routes.

The key board includes a series of keys 80 controlling rock shafts 81 which shafts in turn operate levers 82 for the purpose of throwing tripping members 83 to the position desired, in order to set selective members 50 when the individual pick-up devices come to a point opposite or above the key board. Each tripping member 83 carries an adjusting device or screw 84 for obvious purposes. The devices 83 are mounted on shaft 83' at their lower ends and have pivotal connection with link members 82 extending to the rock shafts above mentioned. Transverse bar 82' acts as a stop for tripping devices 83.

Any suitable mechanism may be provided for operating the rock shafts in groups and combinations, and thereby operating tripping devices 83 in the same manner, and setting selective members 50 also in combinations.

Any given key may operate a single rock shaft or may operate two adjacent shafts or two or more rock shafts in any portion of the apparatus by reason of the fact that bridging members 90 are carried by the stems of the keys and these members being provided with suitable projecting lugs or engaging devices cause the proper rock shafts to be operated.

In Fig. 18 I have shown means for operating bail 62 which engages the lugs 61 of selective members 50 for the purpose of resetting these members just before a given letter pick-up comes to a point opposite the letter feeding device or conveyor 70. Bail 62 has an operating member 91 engaged by a resilient device 92 secured at 93 to a stationary member 94. When the rotating conveyor arrives at the proper point device 92 engages the bail throwing the opposite side thereof upwardly and this disengages all of the members 50 and permits the latter to fall by gravity in order to engage hinged plate 37 when the plate is thrown into horizontal position by coming into contact with resilient member 95 secured at 96 to a stationary member 97. To state the matter otherwise the resettitng operation is made positive and is not dependent upon gravity in view of the fact that resilient member 95 will exert positive action on plate 37 and will force the latter upwardly, the free edge thereof coming in contact with the edge of each selective member 50.

The machine described may be operated either with or without a device for the cancellation of the stamps and post-marking the letters. In connection with the marking apparatus in general, it should be stated that means are provided whereby the designation of a particular operator, such as a letter or number, is marked or printed on each letter as it is received from the conveyor or letter feed.

The cancelling device is shown conventionally at the right of the keyboard and includes a rotary member 121 mounted in a frame 122, which may be positioned by set screw 123 when placing the device in operative position. The ink ribbon is designated 124. Opposite this mechanism is a support 125, acting as a guide for the pick-up device 31 during the cancelling operation. Member 121 rotates by frictional contact with the letter and the required proportion of its circumference may be provided with lines for stamp cancellation and means for impressing the postmark. The details of this cancelling mechanism form no part of the present invention. A type wheel, carrying a character identifying the operator of the machine, is shown at 130 and is provided with a removable type 131. Each operator inserts his particular type before starting the machine.

The letters are loosely held on conveyor 70 by upper arm 110, mounted on standard 112, which also carries retaining devices 113 at the side. The free ends of devices 113 terminate at a point allowing space for one letter of average thickness. I have described means for automatically advancing the conveyor at regular intervals by a step-by-step movement of wheel 72 and means for preventing further advance of the conveyor when the letters are somewhat closely arranged. If further movement is required by reason of the removal of a thick or heavy letter, this further movement may be effected by the manual operation of lever 74' engaging a pin 74" on rod 74 and passing through a slot in the lever. A lug 73" limits the stroke of rod 74.

An automatic stop is shown in the form illustrated in Figure 20 for the purpose of causing each pick-up device 31 to stop opposite the keyboard until the desired key is pressed. Each air duct 14 carries a device 14' comprising a block or the like secured to ring 65, which is provided with spaced lugs 65', engaging catch 130 on arm 131. The latter projects from universal bar 132, which extends transversely of the rock shafts 81 and is normally forced upwardly by springs at the end, one of the springs being shown at 133. Catch 130 and the end of arm 131 operate in a stationary guide member 134. If continuous rotation is desired, catch 130 may be moved out of the path of lugs 65' by releasing set screw 135 and moving arm 131 in socket 136 on bar 132.

Each pick-up device 31 may be provided with strips 31° of felt or fabric for aiding in holding the letters in position while being held by the exhaust. These strips extend over a portion of the face and of each end of the device. The removable tops of the selective devices 5 are retained in position by means of pin 6, having end portions turned at an angle as shown, although any other suitable devices may be employed.

The letters having been placed upon feed conveyor 70 and the driving and air exhaust mechanism, not shown, having been started, a letter pick-up device 31 approaches the letters to be distributed. Upon coming into operative position, a letter is withdrawn by suction and the movement of the main conveyor or belt brings device 31 opposite the keyboard, the address being read by the operator during the interval, and the required marking or cancellation or both being effected before the letter is directly opposite the keyboard. The stop mechanism shown in Figure 20, if employed, causes a momentary pause in the movement of the letter until the desired key is pressed. The pressing of the key releases device 130 and lug 65' in the manner previously described, and the operation of the key also causes the operation of one or more rock shafts 81 and of corresponding tripping devices 83, whereby one or more selective members 50 are skipped and caused to remain in vertical position when the remaining members 50 are swung outwardly and disengaged from hinged plate 37. The selective member 50 remaining in engagement, being the controlling element, is engaged when it comes into contact with the particular pin 76 which governs the discharge of a letter into chute or receptacle 78. The letter drops when valve 35 opens by the release of the remaining member or members 50 and plate 37.

The letter pick-up device 31 is turned into the position shown in Figure 1, above chute 78, by mechanism previously described.

The particular device 31 in question, having discharged its letter, passes around to the other side of the machine and is restored by partial rotation to position transversely of the duct on which it is mounted when device 105 on the back of member 31 comes into contact with stationary member 106. At substantially the same time the mechanism shown in Figure 18 operates to restore hinged plate 37 to horizontal position and selective members 50 to vertical position for retaining plate 37.

If an address cannot be read by the operator, no key is pressed (the automatic stop being released normally) and all the selective members 50 are at once thrown out by tripping devices 83, and the letter falls at the left of the keyboard, where a receptacle known as a "nixie" box may be located. In Figure 22 it will be observed that the automatic stop is not shown.

Throughout the specification and claims such terms as "mail," "letters," "missives" and similar expressions, indicating that the use of this device for sorting articles at post offices or similar places, have been used, and the sorting of such articles at such places will be found one of the principal utilities of the sorting machine disclosed herein. It is, however, obvious that the terms employed are merely employed for convenience and that the machine itself is capable of use upon other articles of data bearing nature or which require sorting to any predetermined standard arrangement, and the use of such terms as outlined is no limitation upon the invention.

What I claim is:

1. In a mail distributing device, pneumatic means including a series of devices mounted to operate successively for removing letters from a pile, means for conveying the devices last specified, at one time, to separate points of discharge, and selective means operable in combinations for controlling the pneumatic means.

2. In a mail distributing device, pneumatic means including a series of letter pickup devices moving in a continuous path and mounted to pick up letters successively from a predetermined locale, means for conveying the pick-up devices at one time to separate points of discharge, and selective means operable in combinations for controlling the means first mentioned.

3. In a mail distributing device, pneumatic means including a series of devices mounted to operate successively for removing letters from a predetermined locale, means for conveying the devices last specified, at one time, to separate points of discharge, and key controlled selective means for controlling the means first mentioned.

4. In a mail distributing device, pneumatic means for holding a letter, and selective means comprising a plurality of members independently movable, and means for tripping said members in groups.

5. In a mail distributing device, a pneumatic letter carrier, means for moving the carrier to the point where the letter is to be discharged, selective means controlling the pneumatic means, and key board mechanism arranged to operate the selective means singly and in groups.

6. In a mail distributing device, pneumatic means for receiving and holding a letter while being moved to discharge position, key controlled selective means for controlling the means first mentioned, and a casing for housing the pneumatic means and mounting said selective means in operative position.

7. In a mail distributing device, pneumatic means for holding a letter, and selective means for controlling the means first mentioned, said selective means including a plurality of shiftable members, a valve, and a valve retaining member operated when released by the shiftable members.

8. In a mail distributing device, pneumatic means for holding a letter, a valve, means for directly retaining the valve, and a plurality of shiftable members arranged to be thrown into position for holding the means last mentioned in a closed position.

9. In a mail distributing device, a pneumatic letter carrier, means for moving the carrier to the point where the letter is to be discharged, selective means including independently movable members controlling the pneumatic carrier, and key board mechanism arranged to operate the selective means singly and in groups.

10. In a mail distributing device, pneumatic means for receiving, conveying, and discharging a letter, selective means controlling the pneumatic means, and keyboard mechanism arranged to operate the selective means singly and in groups.

11. In a mail distributing device, pneumatic means for holding a letter, an exhaust valve connected with said means, and selective tripping means including a series of members mounted to swing in given planes, and a hinged member engaged at times by all of the members first mentioned, said hinged member controlling the valve.

12. In a mail distributing device, a key board, selective tripping means controlled thereby, means for mounting the latter, and a pneumatic device including a letter pick-up and carrier having communication with the mounting means, and controlled by the selective means.

13. In a mail distributing device, a key board, selective tripping means controlled thereby, means for mounting the latter, and a pneumatic device including a letter pick-up and carrier having communication with the mounting means and controlled by the selective means, and a resetting device for the selective means.

14. In a mail distributing device, a pneumatic letter conveying device, and selective mechanism for dropping a letter in a predetermined position, said mechanism including a plurality of independently operating members, means for simultaneously throwing any predetermined group of members to an idle position, and means retained in position by the remaining members for controlling the operation of the pneumatic device.

15. In a mail distributing device, pneumatic means for carrying a letter to a given position, selective means controlling the pneumatic means, and a resetting device for the selective means comprising a plurality of stationary members located respectively above and below the path of the means first mentioned.

16. In a mail distributing device, pneumatic means for holding a letter, selective means including a plurality of members independently movable, means for operating said members in elective groups, and a resetting device for the selective means.

17. In a mail distributing device, a pneumatic letter carrier, means for moving the carrier to a point of discharge, means for positioning the carrier at a new angle before discharging the letter, selective means controlling the pneumatic means, and key board mechanism for operating the selective means singly and in groups.

18. In a mail distributing device, pneumatic means for conveying a letter in a vertical position, and positioning the same in a new plane prior to discharge while maintained in a vertical position, and selective means for controlling the means first mentioned.

19. In a mail distributing device, pneumatic means for holding a letter and positioning the same in a new plane prior to discharge, selective means including a plurality of members independently movable, and means for operating said members in groups.

20. In a mail distributing device, a casing including a chamber, a valve controlling the passage of air therethrough, an air duct, a pneumatic letter carrier connected with the duct, a hinged member controlling the valve, and a plurality of shiftable members independently movable and each at times engaging the hinged member.

21. In a mail distributing device, a casing including a chamber, an air duct entering said chamber, one side of the duct being cut away, a valve controlling the passage of air from one portion of the duct to another portion thereof by way of the casing, a hinged member controlling the valve, and a plurality of members movable in groups for controlling the hinged member and valve.

22. In a mail distributing device, a plurality of air ducts adapted to having connection with exhaust means, a letter carrier mounted on each duct, a continuous conveying device for the ducts, means communicating with said ducts for supporting a plurality of letters to be distributed, a letter receptacle and means for positioning a given carrier at a new angle above said receptacles before discharging the letter.

23. In a mail distributing device, a plurality of air ducts connected with a main inlet, pneumatic letter carriers mounted on certain of the ducts, and selective means operable in combinations controlling the passage of air from each duct to the carrier.

24. In a mail distributing device, a plurality of air ducts connecting with a main inlet, pneumatic letter carriers mounted on certain of the ducts, each duct being provided with an outlet between the inlet and the carrier, and selective means operable in combinations controlling the passage of air from each duct to the carrier.

25. In a mail distributing device, a plurality of air ducts connecting with a main inlet, a rotatable pick-up and carrier on certain of the ducts, a stationary member for producing partial rotation of the carrier upon contact therewith, and selective means operable in combinations controlling the passage of air from each duct to the carrier.

26. In a mail distributing device, a plurality of air ducts connected with a main inlet, pneumatic letter carriers mounted on certain of the ducts, selective means operable in combinations controlling the passage of air from each duct to the carrier, a series of stationary engaging devices arranged in a curved path for operating the selective means.

27. In a mail distributing device, pneumatic means for conveying a letter to a given position, selective means operable in combinations for controlling the pneumatic means, a letter feeding device and automatic means for operating the same.

28. In a mail distributing device, pneumatic means for holding a letter, selective means comprising a plurality of members independently movable, means for tripping said members in groups, a letter feeding device, and automatic means operating the feeding device.

29. In a mail distributing device, pneumatic means for conveying a letter to a given position, selective means operable in combinations for controlling the pneumatic means, means for marking a letter while being conveyed by the pneumatic means, and guiding means for holding the pneumatic conveying means during the marking operation.

30. In a mail distributing device, pneumatic means for conveying a letter to a given position, selective means for controlling the pneumatic means, means for feeding a letter to the pneumatic means, means for marking a letter while being conveyed by the pneumatic means, and guiding means for holding the pneumatic conveying means during the marking operation.

31. In a mail distributing device, a conveying device including a plurality of air ducts adapted to have connection with exhaust means, a pick-up device mounted for partial rotation with respect to each duct, and stationary means adapted to contact with the pick-up device upon movement of the conveying device and effecting a partial rotation of the pick-up device.

32. In a mail distributing device, a conveying device including a plurality of air ducts adapted to have connection with exhaust means, a pick-up device mounted for partial rotation with respect to each duct, and stationary means adapted to contact with the pick-up device upon movement of the conveying device and effecting a partial rotation of the pick-up device, a fixed member, and controlling means operated upon contact with the fixed member for governing the passage of air through the ducts.

33. In a mail distributing device, a flexible conveying device, means for producing a continuous air passage adjacent to the conveying device throughout its extent, a series of air ducts mounted on the conveying device and connected with the air passage, and a letter pick-up device mounted on each duct.

34. In a mail distributing device, a conveying device, means for producing a continuous air passage adjacent to the conveying device throughout its extent, a series of air ducts mounted on the conveying device and connected with the air passage, a letter pick-up device and a controlling device therefor mounted on each duct.

35. In a mail distributing device, a flexible conveying device, a plurality of letter pick-up devices mounted thereon, and controlling means carried by the pick-up devices comprising air exhaust apparatus and a plurality of selective devices operable in combinations.

36. In a mail distributing device, a flexible feeding device comprising a portion of an air exhaust passage continuous with the feeding device, a plurality of pick-up devices mounted on the feeding device, and controlling means for the pick-up devices comprising a plurality of selective devices operable in combinations.

37. In a mail distributing device, a casing including a chamber, a valve controlling the passage of air therethrough, an air duct, a pneumatic letter carrier connected with the duct, a hinged member controlling the valve, a plurality of members independently movable and each at times engaging the hinged member, and means for releasing the movable members and simultaneously operating the hinged member for restoring them to initial position.

38. In a mail distributing device, a casing including a chamber, a valve controlling the passage of air through the chamber, an air duct, a pneumatic letter carrier connected with the duct, a hinged member controlling the valve, a plurality of shiftable members independently movable and each at times engaging the hinged member, means including a bail for releasing the shiftable members, and a plurality of resilient members for simultaneously engaging the bail and hinged member and restoring them to initial position.

39. In a mail distributing device, a casing including a chamber, an air duct entering said chamber, one side of the duct being cut away, a valve controlling the passage of air from one portion of the duct to another portion thereof by way of the casing, a hinged member controlling the valve, a plurality of shiftable members movable in groups for controlling the hinged member and valve, means including a bail for releasing the shiftable members, and a plurality of resilient members for simultaneously engaging the bail and hinged member and restoring them to initial position.

40. In a mail distributing device, pneumatic means for conveying a letter to a given position, selective means operable in combinations for controlling the pneumatic means, mechanism for imparting intermittent motion to the conveying means, and means for successively placing individual groups of selective means in normal position.

41. In a mail distributing device, pneumatic means for conveying a letter to a given position, selective means operable in combinations for controlling the pneumatic means, mechanism for imparting intermittent motion to the conveying means, and mechanism for setting the selective means and automatically controlling the intermittent motion of the conveying means.

42. In a mail distributing apparatus, a conveying member, means for operating said conveying member in substantially vertical planes, and a pneumatic letter pick-up device carried by the conveying member and moving in a continuous path.

43. In a mail distributing apparatus, a conveying member, means for operating the conveying member in substantially vertical planes, a pneumatic letter pick-up device carried by the conveying member and moving in a continuous path, and selective means carried by the pick-up device.

44. In a mail distributing appartus, a plurality of pneumatic devices mounted to remove letters successively from a predetermined locale, and means for conveying said plurality of pneumatic devices, at one time, to separate points of discharge.

45. In a mail distributing apparatus, a plurality of pneumatic devices mounted to remove letters successively from a predetermined locale, and means for conveying said plurality of pneumatic devices at one time, in a continuous path, to separate points of discharge.

46. In a mail distributing apparatus, a plurality of pneumatic devices mounted to remove letters from a point of supply and operating successively, means for effecting successive and selective control of the pneumatic device, and means for conveying said plurality of pneumatic devices to separate points of discharge.

47. In a mail distributing apparatus, a plurality of pneumatic letter pick-up devices for removing letters from a predetermined locale, a series of letter receptacles, moving means on which said pneumatic pick-up devices are mounted for conveying the latter in a path adjacent to the receptacles, and selective means for controlling the discharge of letters, each to a given receptacle from the pneumatic pick-up devices.

48. A distributing machine comprising a support for a stack of missives, a member traveling by the stack of missives, means to exhaust the air from said member to employ atmospheric pressure to convey a missive in conjunction with said member, and means to equalize the aerostatic pressure at a selectively predetermined point to release said missives.

49. A distributing machine comprising means to support a stack of missives, a member adapted to travel by said stack of missives, means to employ atmospheric pressure to cause one of said missives to travel with said member, and means at a selectively predetermined point to release said missive from atmospheric control.

50. A distributing machine comprising a traveling part, means to employ atmospheric pressure to cause a missive to travel with said traveling part, and means selectively interposed in the path of movement of said traveling part to overcome the effectiveness of the atmospheric pressure.

51. A distributing machine comprising means to employ atmospheric pressure to move a missive, and means at selectively predetermined points to overcome the effective action of said atmospheric pressure.

In testimony whereof I affix my signature.

PAUL BURKERT.